Figure 3:
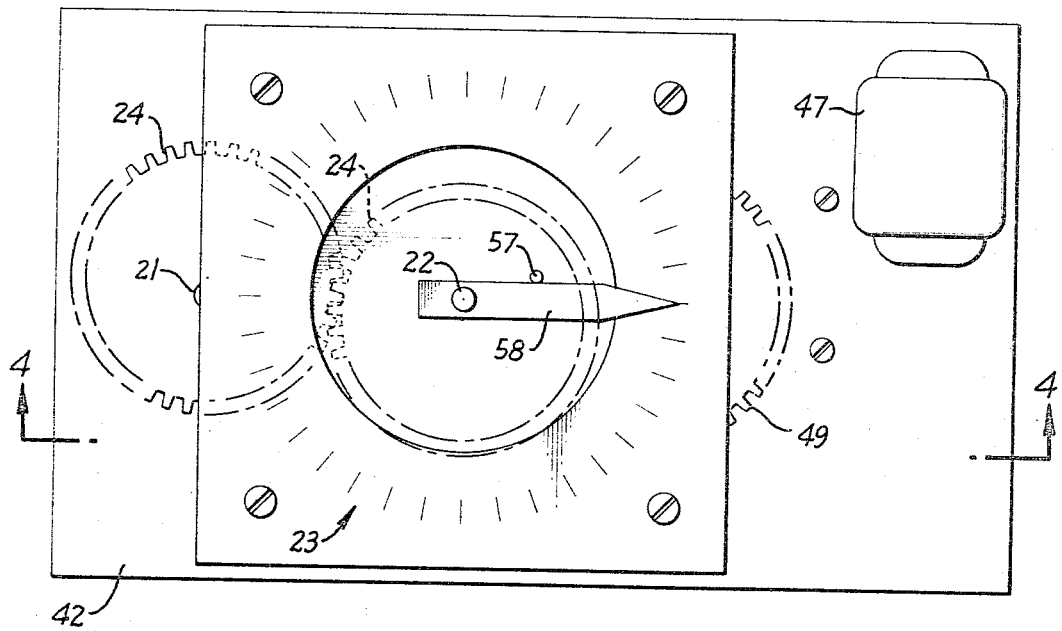

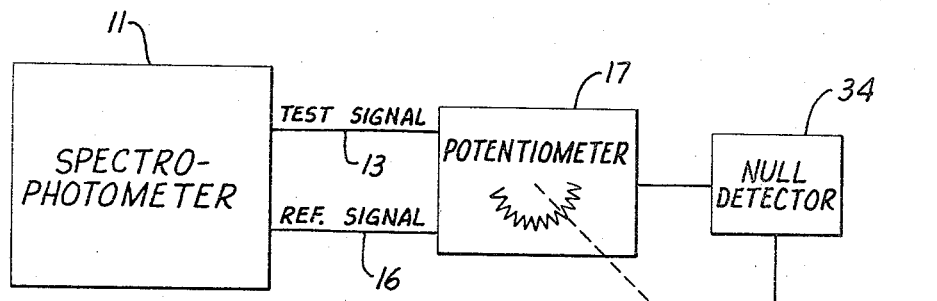
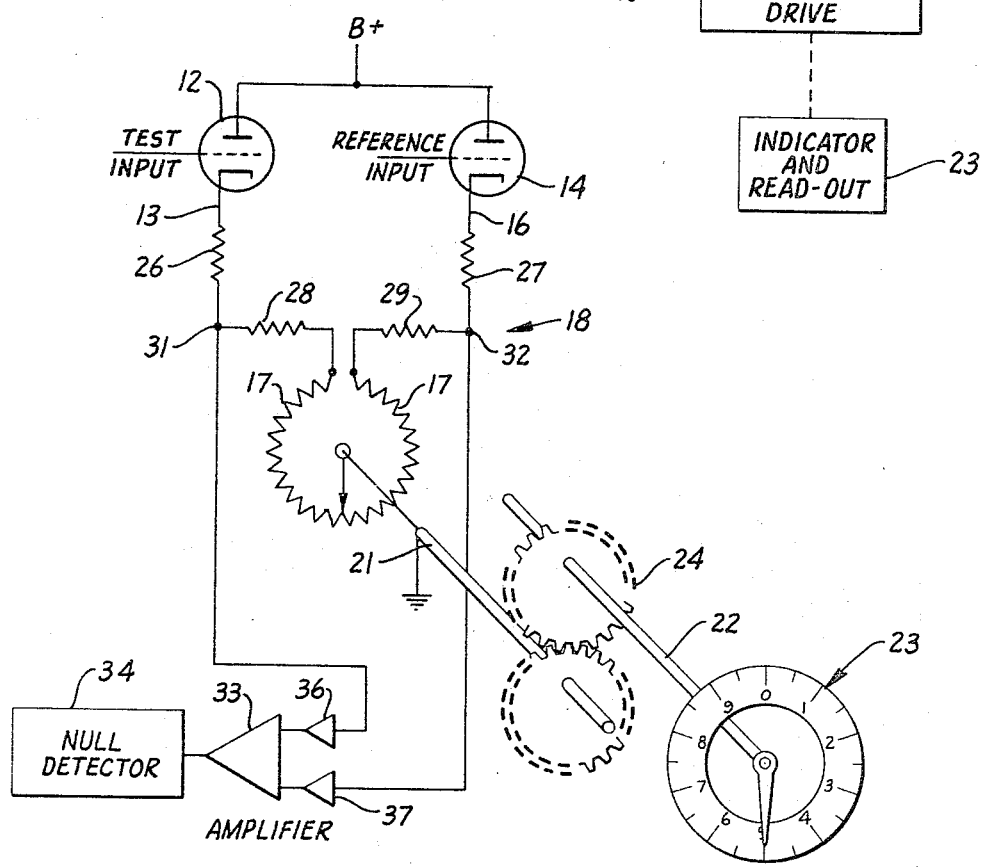

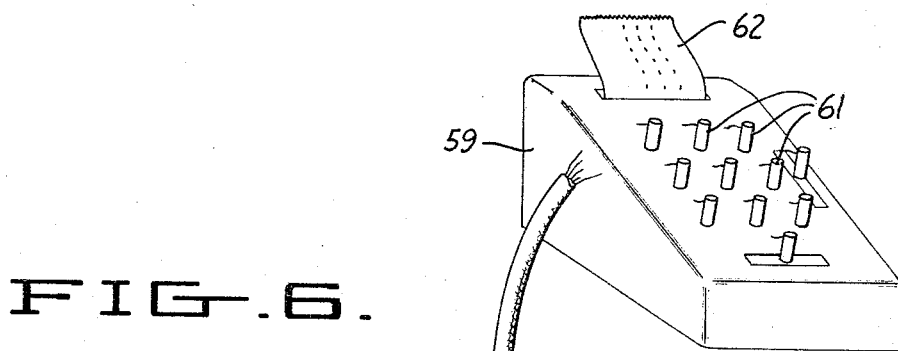
FIG. 6.
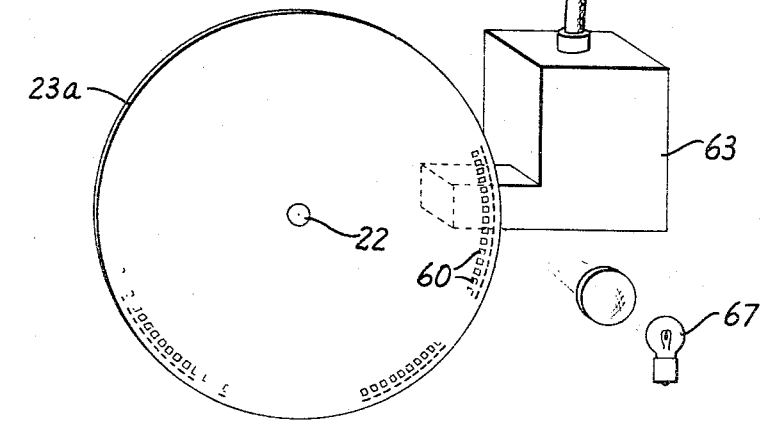
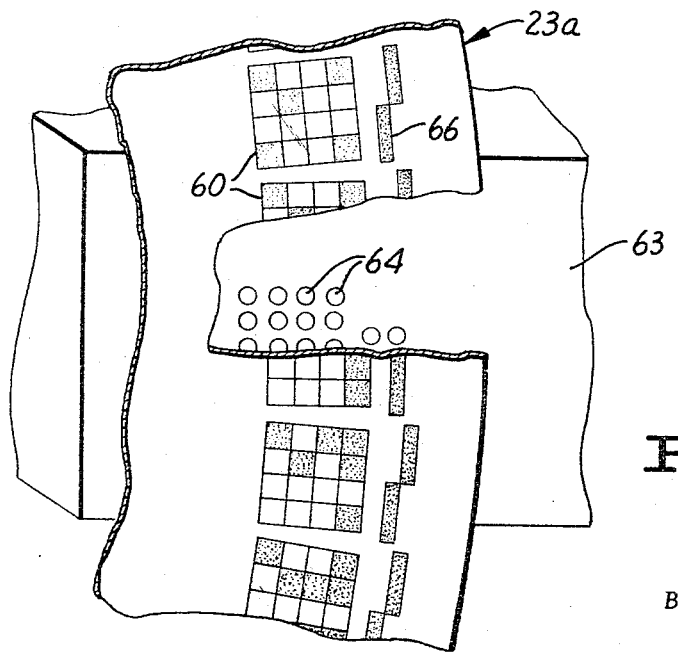
FIG. 7.
INVENTOR.
ERIK W. ANTHON
BY Schapp & Hatch
ATTORNEYS – # United States Patent Office 3,323,058
Patented May 30, 1967

3,323,058
AUTOMATIC REBALANCE MEASURING SYSTEM WITH ITS INDICATOR COUPLED BY ECCENTRIC DRIVE MEANS FOR SCALE DISTRIBUTION CONTROL
Erik W. Anthon, Kensington, Calif., assignor, by mesne assignments, to Warner-Lambert Pharmaceutical Company, Morris Plains, N.J.
Filed July 12, 1963, Ser. No. 294,608
11 Claims. (Cl. 324—132)

The present invention relates to improvements in a system for measuring and indicating a quantity having scale distribution control means and more particularly to a system for converting a measured quantity which varies as a nonlinear function to a substantially linear function for measurement on a substantially linear scale.

Certain instruments measure quantities and indicate them on a dial or the like where the scale of the dial is irregular in order to calibrate for measurements of functions that vary on a nonlinear scale. Such dials or like scales have the disadvantage of reduced accuracy in the areas where the numbers are compressed together, and of inconsistent accuracy between different parts of the scale.

It is also sometimes desirable to use a mechanical position of a dial or the like to direct a signal for automatic recording. In certain cases, this signal may be directed from coded indicia on a tape or dial, and a specific form of this invention utilizes such a system. The substantially linear distribution of the coded indicia is not only important to provide more uniform accuracy, but it is also valuable in allowing more indicia to be placed on a given sized dial or the like.

The invention has been developed particularly for use in automated analytical equipment, and is particularly useful in a fully automated measuring and indicating apparatus adapted to be combined with other automated analytical units. By combining various units or modules, it is possible to provide various completely automated systems in which samples are provided to the unit and the analytical results desired for the samples are recorded, all of the analytical procedures being carried out automatically by the units combined for the purposes.

Many instruments have been developed for measuring physical properties which are indicative of a qualitative or quantitative measurement and are suitable for analytic purposes. Certain of these instruments are now utilized to measure a physical property in which the property being measured varies with respect to the quantity being measured according to a nonlinear function, such as those which vary according to Beer's law. This is particularly true of the spectrophotometer, densitometer or other instruments in which the absorption of radiant energy or a special frequency band thereof, which occurs when the radiant energy is passed through a sample, is the physical property utilized for determining the analytical results. In such a case, it is seen that the absorption coefficient from the light measured passing through a solution of a given sample in a nonabsorbing solvent is proportional to the concentration thereof. In general, the absorption of the light or a narrow wave length band thereof is measured for a test sample containing the sample being measured and compared to the absorption of such light in a reference sample containing solvent and all of the test reagents. In this way the result being measured can be expressed as the ratio of the reference absorption divided by the test absorption.

Since the quantity being measured varies according to Beer's law, the absorption will vary with respect to the quantity being measured as a logarithmic function thereof and this relationship must be taken into consideration when representing the signals on an indicator device.

A number of ways have been developed for the conversion of variations on a logarithmic scale to a linear representation and the present invention is directed to an improved method of automatically and rapidly providing this conversion while maintaining a uniform accuracy. Obviously, the indicator could simply be operated from the signal through an amplifier or the like to a dial which is calibrated with a logarithmic scale such as that found on a slide rule. However, with such a scale the low end thereof can be read more accurately than the upper end and considerable variation in reliability of the results are obtained. In general, in order to provide maximum accuracy of the sensing devices of the character herein utilized such as a spectrophotometer, the signals are balanced in a bridge circuit or the like.

Accordingly, the conversion could be effected by utilizing a logarithmic potentiometer or variable resistance in which the variations are represented on a logarithmic scale. However, this solution requires resistances which must be accurately scaled in logarithmic fashion and such resistances are extremely expensive and less accurate than linear scales. Elaborate circuitry can also be utilized for making the conversion, but this circuitry also requires rather expensive parts which must be carefully assembled to provide the necessary accuracy.

In accordance with the present invention, a linear potentiometer or variable resistance which varies on a linear scale or other such means is utilized and the conversion between the logarithmic change and the linear scale is accomplished by utilizing an eccentric gear drive therebetwen. Preferably, the logarithmic variation utilized is adjusted by the bridge circuit as close to a straight line as practical without bringing excessive resistances into the system and this scale converted to the desired range so as to minimize the function of the eccentric gears and to bring the results obtained thereby closer to actual linear results.

Another important feature of the invention is to provide such an indicator system which is capable of rapid operation so that many independent determinations can be obtained on the machine in a minimal period of time and the entire unit may be advantageously utilized in automated operation. Accordingly, the invention also provides a drive means capable of positioning the indicator to a position corresponding with the quantity being measured in a rapid yet accurate manner.

As indicated above, it is desired to utilize the present invention in automated systems and a subsidiary feature of the present invention is to provide an indicator and recording apparatus which may be operated according to the system herein described. This indicating and recording apparatus also operates for an indicator which is substantially linear in variation to provide uniform reliability and minimize the size of parts needed.

Accordingly, it is the primary object of the present invention to provide a measuring and indicating system in which the function to be measured varies on a nonlinear scale which is converted to a linear scale to provide substantially uniform reliability of measurement.

Another object of the invention is to provide a measuring and indicating system which may be attached to conventional spectrophotometers or the like to provide the improved indicator reliability mentioned above.

A further object of the invention is the provision of a measuring and indicating system of the character described in which a further attachment is incorporated therewith for making permanent records of quantities sensed and passed to the indicating system.

A still further object of the invention is to provide a measuring and indicating system of the character described which is especially suited for automation and use with a sequence of different measurements.

Still another object of the invention is to provide a system of the character described which is rapid and accurate in operation yet which is easily fabricated from parts which are available commercially and have the characteristics of being reliable in construction and readily available.

Further objects and advantages of the invention will appear as the specification proceeds, and the new and useful features of this measuring and indicating system will be fully defined in the claims attached hereto.

Figure 4:
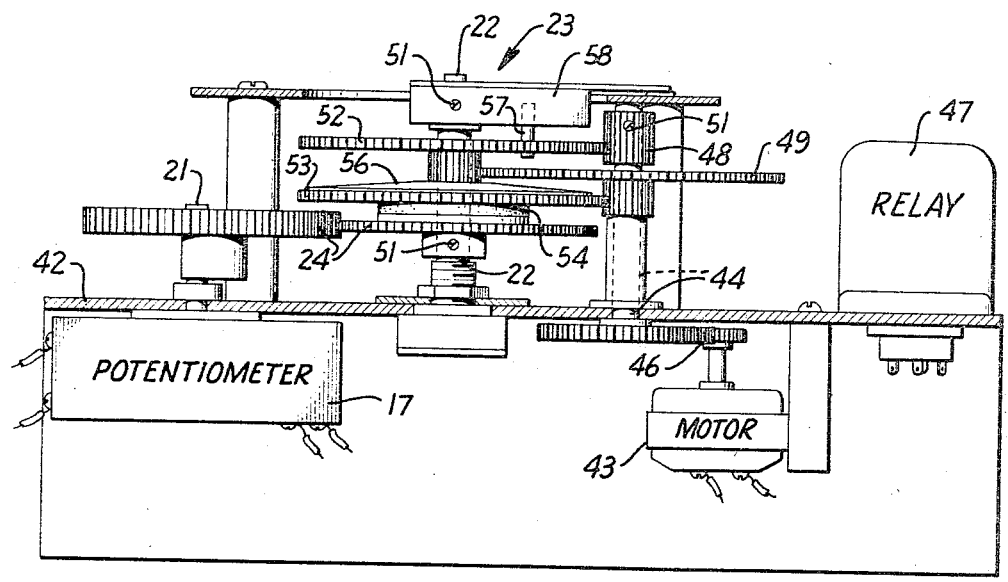
Figure 5:
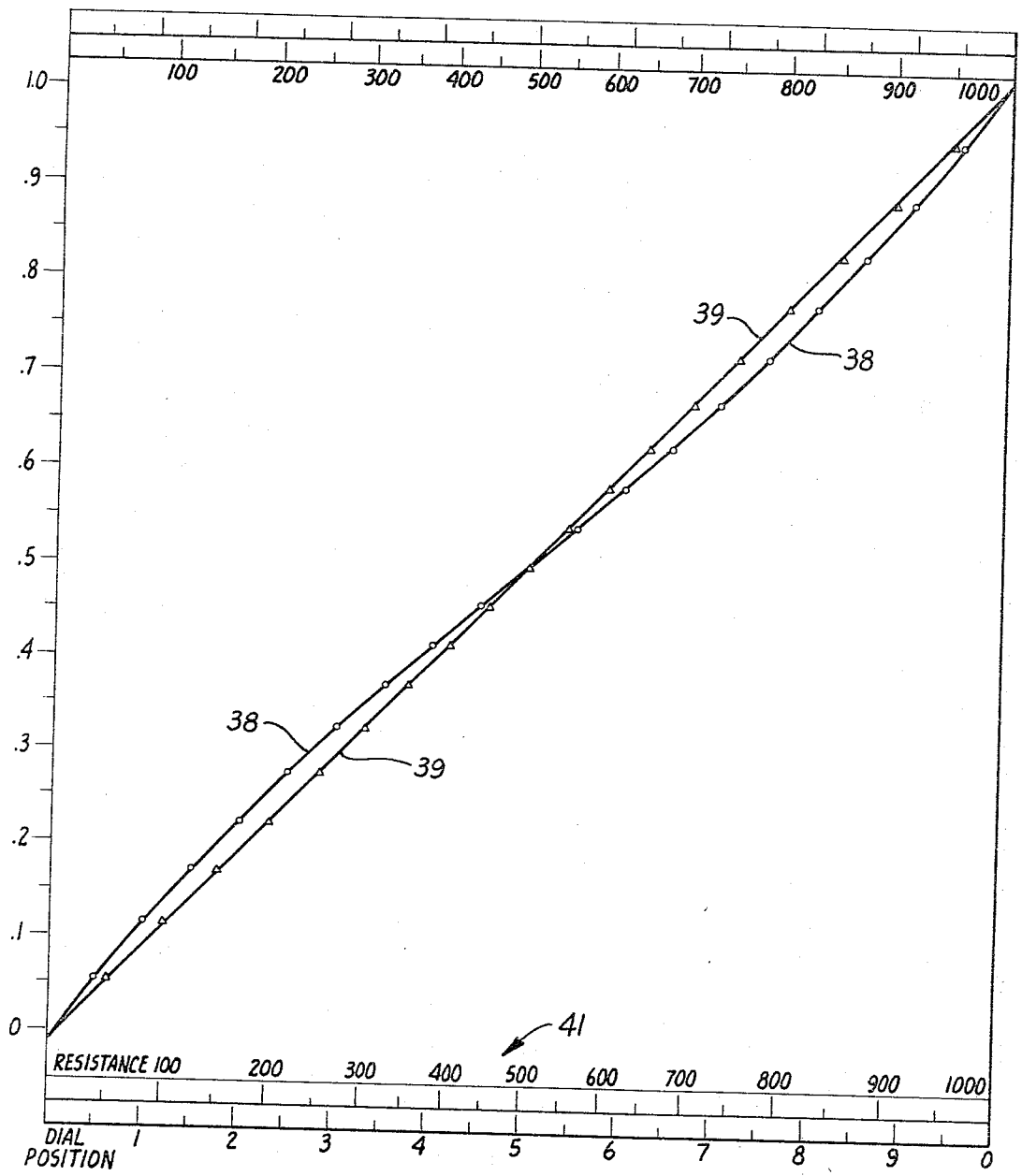

The preferred forms of the invention are illustrated in the accompanying drawings, forming a part of this application, in which:

FIGURE 1 is a diagrammatic view of a typical system for measuring results sensed by a spectrophotometer and automatically recording such results in a system constructed according to the invention;

FIGURE 2, a diagrammatic view illustrating the conversion of the measurements obtained in the spectrophotometer of FIGURE 1 which vary as a nonlinear function to a substantially linear function that is represented on a dial;

FIGURE 3, a plan view of a drive system constructed according to the invention and illustrating a preferred system for driving the dial to the correct position;

FIGURE 4, a cross-sectional view of the drive system shown in FIGURE 3 taken in the plane of line 4—4 thereof;

FIGURE 5, a graphical representation illustrating the variation from a linear function using the system illustrated in FIGURE 1;

FIGURE 6, a diagrammatic view illustrating a recording system utilized in a preferred form of the invention, and FIGURE 7, an enlarged fragmentary view of a portion of the device illustrated in FIGURE 6 illustrating in greater detail the coded dial thereof.

While I have shown only the preferred form of my invention, it should be understood that various changes or modifications may be made within the scope of the claims attached hereto without departing from the spirit of the invention.

Referring to the drawing in greater detail and particularly to FIGURE 1, there is shown a spectrophotometer 11 which measures certain optical characteristics of a test sample and the same measurement is made on a reference sample. In a typical set-up, the test measurement is made by a photo sensing device and used to impress the grid of a test cathode follower 12 to provide a test signal in line 13. Similarly, a measurement is made on a reference sample and used to impress the grid of a reference cathode follower 14 and provide a corresponding reference signal in line 16.

The reference signal and the test signal are compared in a linear potentiometer 17 which is included as a part of a bridge circuit 18, and contains means 19 associated therewith for driving the potentiometer so as to provide a null position in the bridge circuit. This means 19 not only drives the potentiometer, but it also drives the indicator or recorder which is used to show the answer being sought.

A preferred drive means for driving the potentiometer to the proper position while driving an indicator or associated system is shown diagrammatically in FIGURE 2 in which there is shown a shaft 21 in position to drive the potentiometer 17, a shaft 22 operatively connected to the indicator such as the indicator 23, and eccentrically mounted gears 24. These eccentrically mounted gears are designed with an appropriate eccentricity to substantially straighten out the irregular curve traced on shaft 21 so that the rotation of shaft 22 varies substantially linearly with respect to changes in the sample being tested. A suitable motor or other means is preferably provided to drive the shafts 21 and 22 and provide automatic operation of the device. Control of such a suitable motive device is integrated back into the operation of the potentiometer through the bridge circuit thereof as indicated diagrammatically in FIGURE 1.

The bridge circuit 18 is utilized to provide excellent accuracy with the potentiometer being positioned at the null point for the final answer. This assures exceptionally accurate results at the final answer position and such mechanisms are conventional in spectrophotometers. However, the specific design of the bridge circuit is important in the present invention in providing the data on a scale extending from zero through one and in a form most easily corrected by the eccentric gear system of the invention.

Thus, resistances 26 and 27 are included in lines 13 and 16 which receive the test signal, and resistances 28 and 29 are included in the legs of the bridge containing the potentiometer 17. Points 31 and 32 of the circuit are thus to be balanced to the null point by the potentiometer when a test is made with the position of the potentiometer indicating the result being measured. Thus, a comparison is made of the electrical characteristics at 31 and 32 through difference amplifier 33 which provides a signal representing the difference to the null detector 34. Thus, the null detector 34 is electrically connected to the bridge circuit and operatively influenced by the position of the potentiometer 17, and the null detector is also operatively connected to the potentiometer drive and indicator drive as indicated diagrammatically in FIGURE 1. With this arrangement, the system is designed so that the drive system will automatically drive the potentiometer until the null point is reached on the null detector and the indicator is in position to show the answer depending on the materials placed in the test position and reference position of spectrophotometer 11.

As indicated above, it is desirable to have the potentiometer read a scale of values from zero to one in the test being made while in a typical bridge set-up the potentiometer would operate through a positive and negative range. By utilizing a positive and negative range from minus 0.5 to plus 0.5 and translating this scale from zero to 1.0, it is possible to utilize the better part of the logarithmic curve. This translation is achieved by utilizing amplifiers 36 and 37 in front of the difference amplifier 23. For the conversion desired, the ratio of these amplifiers should be the square root of 10, or stated differently, one amplifier should amplify its signal in amount of the square root of 10 times the amplification obtained in the other amplifier. A family of mathematical curves are represented in the characteristics of the curve utilized in the system of this invention, but in all cases, it is necessary to have at least some eccentricity in the gear system between the potentiometer shaft and the indicator shaft in order to obtain as nearly a linear function as possible. Accordingly, the actual values for the resistances and eccentricities, may vary widely. The values given herein are given to illustrate a typical example which has been found satisfactory for the purpose.

Thus, in the embodiment shown, the potentiometer 17 is a lineal slide wire potentiometer having 1000 ohm scale in which 970 ohm range is used. The resistances 26 and 27 are fixed resistances each being 3900 ohms and the resistances 28 and 29 are fixed resistances of 330 ohms each. Thus, with this particular example of resistance values and amplifiers, the curve characteristics are illustrated in the curve 38 of FIGURE 5. With these values, the eccentricity of the gears is to be ⅛″ off-set from the center with gears having a 2½″ pitch diameter. The curve obtained after use in these eccentric gears is illustrated as curve 39 in FIGURE 5. Thus, it is seen that curve 39 substantially straightens out the relationships to bring the function vary close to a linear function. Thus, the eccentric gears have the effect of changing curve 38 to curve 39. This variation is better illustrated by the scale 41 at the bottom of FIGURE 5, in which the variation between the resistance measured on the potentiometer and the dial position which is representative of the result being measured as shown.

As indicated above, it is desirable to use a linear potentiometer in which the resistances are accurately laid out on a linear scale and this means that the resistance figures shown in FIGURE 5 must be obtained through the eccentric gears to make the resistance scale linear. Accordingly, where eccentric gears are used, the dial scale is substantially linear also. With the example given, it is found that there are still very minor deviations because the curve is of such nature that the eccentric gears do not make it a completely linear function. Since the analytical work to be accomplished by the apparatus of this invention is to provide maximum accuracy, it is proposed to include these minute deviations on the indicator scale. In the preferred form of the invention where a recording mechanism is used, it is preferred to include the most minor calculable deviations into the recorder system. In this way, maximum accuracy is achieved with comparatively inexpensive components.

Referring again to the potentiometer drive and indicator drive, another feature of this invention is to provide an improved drive system which combines speed in locating the null position with comparatively inexpensive reliable equipment. In other words, although a conventional servo motor could be used to drive the potentiometer to the null position, it is preferred to utilize the drive mechanism shown in FIGURES 3 and 4.

Referring more particularly to FIGURE 4, there is shown a suitable frame or a chassis 42 carrying the potentiometer 17 together with its shaft 21 and eccentric gears 24 serving to connect the potentiometer shaft 21 with the indicator shaft 22. These gears are constructed to have the same degree of eccentricity as that defined above. Thus, gears 24 are continuously engaged and attached to their respective shafts 21 and 22. In association with shaft 22, is an indicator 23 which is shown in FIGURES 3 and 4 as a simple dial. However, it should be understood that shaft 22 may be utilized to drive a special dial having special recording units associated therewith such as the recording system illustrated in FIGURES 6 and 7 herein. Alternatively, other recording mechanisms may be used. In addition, it is possible to utilize both the recording device and the visual indicator dial, if desired.

In order to drive the potentiometer to the null point while driving the dial or other associated equipment, any one of a number of systems may be used. However, it is a feature of this invention to provide a novel drive means in which a conventional reversible motor is used together with means for rapidly driving the potentiometer to the null point. Thus, as shown in FIGURE 4, a motor 43 is shown which provides forward or reverse power to shaft 44 through spur gears 46. This motor is driven in a forward or reverse position by a relay 47 which is sensitive to which side of the null position the potentiometer is on. In other words, if the potentiometer is on one side of the null position, the relay throws in a circuit to drive the motor toward the null position, but as soon as the potentiometer reaches the other side of the null position, the relay acts to throw the motor in reverse position.

In this way, the motor drives the potentiometer toward the null position. However, it will be appreciated that if the motor drives the potentiometer at a very great rate of speed, the interia of the motor and drive system will carry the potentiometer beyond the null point. This will cause the potentiometer to oscillate back and forth over the null point. On the other hand, if the motor drives through the whole range at a slow speed, it will take an inordinately long time for the potentiometer and indicator to come to its proper stopping place.

For this reason, I have provided a novel drive system in which the motor first drives the potentiometer rapidly toward the null point until it reaches the null point, and then as the motor tends to drive in reverse, it is driven at a very slow rate of speed so as to come back accurately onto the null point. Since the motor drive at a slow rate of speed for a very short angular distance, the entire operation takes place rapidly and the indicator is positively positioned in the null location.

In general, any drive system capable of driving to a position in a rapid manner and then reversing itself slowly to take up the override is suitable. A typical drive mechanism is shown in FIGURE 4, in which power is transmitted from shaft 44 to shaft 22 from where it operates the potentiometer and indicator as explained above. As here shown, shaft 44 has a small spur gear 48 secured thereto by set screw 51 for rotation with the shaft and also carries a connected pair of spur gears 49 which are journaled for rotation with respect to shaft 44. Shaft 22 carries its eccentric gear 24 and its pointer 23 rigidly thereon by means of set screws 51 or the like, while gears 52 and 53 are journaled for rotation with respect to shaft 22. Gear 53 contains a friction washer 54 on one side thereof and a spring 56 on the other side thereof so that the spring 56 urges washer 54 against gear 24 and causes gear 53 to impart its rotational motion to gear 24 and shaft 22. When driving is accomplished through this friction clutch mechanism, the shaft 24 is driven rather slowly by virtue of the reduction gears involved in the gear chain. For example, the driving motion here shown is traced from small gear 48 to the large spur gear 52, back through the small spur gear 52 to large spur gear 49, and back from small spur gear 49 to large spur gear 53 to shaft 22. This provides considerable gear reduction and causes extremely slow positioning of the indicator 23 and the potentiometer 17. Accordingly, this drive movement is suitable for final positioning of the indicator dial and potentiometer.

In order to provide the initial rapid driving to quickly position the potentiometer and indicator, rapid driving is accomplished by means of a pin 57 carried on gear 52 and adapted to abut a vane 58 which is essentially a radially extending flange on the lower surface of dial 23. Thus, driving may be effected directly by gear 52 to dial 23 on either side thereof when this pin strikes the vane 58. However, after the dial has been moved by the pin 57 to the null point, the driving direction of the motor is reversed and pin 57 then proceeds in a reverse direction. Accordingly, before the pin 57 makes one complete revolution, the slow driving mechanism acting through the clutch will position the potentiometer at the null point to shut off the motor for final reading. It should be noted, that the clutch serves to allow the fast driving motion by virtue of the fact that the clutch slips and allows gear 24 to move rapidly along with the shaft 22.

Although it is within the ambit of this invention to provide a visual readout, if desired, it is also valuable in an apparatus of this nature to provide an accurate recording system and the present invention is imminently suitable for automatic recording devices. This is particularly true because the substantially lineal spacing on the dial or the like, provides substantially even spacing for indicia or coding which may be utilized to actuate automatic recording mechanisms.

A preferred automatic recording system, that may be used in accordance with the present invention, is shown in FIGURES 6 and 7 in which an indicator 23a is provided with the eccentric driving relation to the linear potentiometer as explained above for indicator dial 23. The dial 23a is preferable a large plastic disc which is substantially transparent and contains one thousand coded units 60 spaced therearound to indicate the one thousand readings from 0.000 to 1.000. These indicia may be spaced accurately to accommodate slight calibration variations as explained above so that an exceedingly accurate recording instrument is provided.

As shown in FIGURES 6 and 7, the dial 23a is positioned automatically as explained above and when the dial is positioned, a readout signal is provided from the machine which causes the recorder to operate. This recorder may be a standard adding machine as here shown equipped with suitable devices to translate the dial position to a number for printing on a tape. As shown in FIGURES 6 and 7, a suitable recording device comprises a standard adding machine 59 having relays 61 to operate the keys in the conventional manner according to the signals received from a coded unit 60 and a paper strip 62 for receiving recorded data. The signals are passed to the relays 61 through a light receiving device 63 which has a group of photoelectric cells 64 in position behind the coded portions of the tape to sense the signal for operating the relays 61. Dial 23a not only contains the coded indicia mentioned above, but it contains locator strips 66 for positioning the dial so as to align the code sections before activation of the adding machine 59.

In operation, a test sample is placed in position in the spectrophotometer either manually or by associated automatic equipment. The potentiometer is thrown out of balance so that its bridge circuit operates the motor 43 through relay 47, to drive the potentiometer to the position determined by the sample. This drive is accomplished by an initial rapid movement until the zero point is reached, and then the overdrive is taken up by slowly driving the potentiometer backwards. After the potentiometer reaches the null point, a signal is given to the recording device which carries out the recording cycle.

This cycle operates by the light from light source 67 shining through the tape and first causing the locator strips to align the tape in one of the series of positions corresponding to the nearest coded unit. With the dial thus accurately aligned, a signal is passed on from the aligning mechanism to the adding machine 59 so that the relays 61 will operate according to the signals received through the coded area. In this way, an answer is printed on paper 62 corresponding to the test sample which has been put into position in the spectrophotometer. A more full description of the operation of the coded indicia in a photoelectric locator system may be found in the copending application of Hans Baruch and Erik W. Anthon, the inventor of the present application assigned to the same assignee as the present invention entitled Automated Spectrophotometric System filed Dec. 27, 1962 with Ser. No. 247,622. If desired, other automatic recording mechanism could be used for recording the indicated values on the dial.

From the foregoing description, it is seen that I have provided an especially valuable system for converting the logarithmic functions obtained in spectrophotometers and like to a linear function so that an extremely accurate instrument is provided from parts which are easily obtained and simple in construction.

I claim:

1. A system for measuring and indicating a quantity which has been sensed and converted into a ratio of a pair of electrical signals in which the logarithm of the magnitude of the ratio of signals indicates the linear magnitude of the quantity being measured, comprising a bridge circuit including a linear potentiometer, detector means electrically connected to said bridge circuit responsive to the ratio of signals and the position of the potentiometer, said detector means and bridge circuit being constructed to provide a shift and flattening of the logarithmic curve defining the relation between the quantity to be determined and the ratio of signals measured whereby both the negative and positive area of the curve are utilized in the positive scale measured, motive means responsive to said detector means for driving the potentiometer to a position determined by the ratio of signals, an indicator means, and eccentrically mounted gears drivingly connected between the potentiometer and the indicator means whereby logarithmic variations in the signal ratio being tested are converted to corresponding substantially linear variations on said indicator means.

2. The system for measuring and indicating a quantity defined in claim 1, in which the motive means drives the indicator through a drive system comprising a gear chain adapted to drive the potentiometer at a rapid pace and then at a slow pace over a short distance each time the driving direction is reversed, a slip clutch in said gear chain, a drive element on one of the gears in the gear chain, and drive receiving means on the indicator for driving engagement with the drive element to provide rapid drive of the indicator, said drive receiving means constructed to provide a pair of spaced drive positions adapted to drive in opposite directions.

3. The system for measuring and indicating a quantity defined in claim 1, in which a recording device is operatively connected to the indicator for recording a result shown on the indicator and providing a permanent record.

4. A system for measuring and indicating a quantity which has been sensed and converted into a ratio of a pair of electrical signals in which the logarithm of the magnitude of the ratio of signals indicates the linear magnitude of the quantity being measured, comprising a bridge circuit including a linear potentiometer, detector means electrically connected to said bridge circuit responsive to the ratio of signals and the position of the potentiometer, said detector means including a difference amplifier electrically connected to a pair of balance positions in the bridge circuit and a pair of amplifiers located so that one amplifier is connected between the difference amplifier and one of said balance positions, and the other of said amplifiers is located between the difference amplifier and the other of said balance positions, said amplifiers having different amplification values, with the ratio of amplification values being substantially the square root of ten, a first shaft drivingly connected to the potentiometer, indicator means for showing the result being measured, a second shaft drivingly connected to the indicator means, said first and second shaft being connected through eccentrically mounted gears so that the position of the indicator means is dependent on the positions of the potentiometer and the eccentrically mounted gear provide a conversion of logarithmic variation on the potentiometer to substantially linear variation on the indicator means, and motive means responsive to said detector means for driving the potentiometer to a position determined by the ratio of signals.

5. The system for measuring and indicating a quantity defined in claim 4, in which the motive means drives the indicator through a multiple speed gearing system which is adapted to drive the potentiometer at a rapid pace and then at a slow pace over a short distance each time the driving direction is reversed.

6. The system for measuring and indicating a quantity defined in claim 4, in which the motive means comprises a gear train adapted to drive the first and second shaft slowly, a slip clutch in said gear train, rapid drive means for driving said first and second shafts through a fraction of said gear train, and means for disengaging said rapid drive means when the driving direction is reversed.

7. The system for measuring and indicating a quantity defined in claim 6, in which the rapid drive means contains a pin rotatably mounted on a gear of said gear chain and a vane extending radially from one of said shafts for providing driving engagement when the pin abuts the shaft and disengagement on reverse movement of the pin for about one revolution thereof.

8. The system for measuring and indicating a quantity defined in claim 4, in which a recording device is operatively connected to the indicator for recording a result shown on the indicator and providing a permanent record.

9. A system for measuring and indicating a quantity which has been sensed and converted into a ratio of a pair of electrical signals in which the logarithm of the magnitude of the ratio of signals indicates the linear magnitude of the quantity being measured, comprising a bridge circuit containing a linear potentiometer and a network of fixed resistances, an amplifier system connected to said bridge circuit containing a pair of amplifiers having a ratio of amplification equal to the square root of 10, detector means electrically connected to the amplifiers for detecting an unbalanced bridge condition, motive means responsive to said detector means for driving the potentiometer to a position which balances the bridge, and an indicator means drivingly connected to said motive means through eccentric gears whereby logarithmic variations in the signal ratio being tested are converted to corresponding substantially linear variations on said indicator means.

10. A system for measuring and indicating a quantity which has been sensed and converted into a ratio of a pair of electrical signals in which the logarithm of the magnitude of the ratio of signals indicates the linear magnitude of the quantity being measured, comprising a bridge circuit containing a linear potentiometer and a network of fixed resistances, an amplifier system connected to said bridge circuit containing a pair of amplifiers having a ratio of amplification equal to the square root of 10, detector means electrically connected to the amplifiers for detecting an unbalanced bridge condition, a first shaft drivingly connected to the potentiometer, indicator means for showing the result being measured, a second shaft drivingly connected to the indicator means, said first and second shaft being connected through eccentrically mounted gears so that the position of the indicator means is dependent on the positions of the potentiometer and the eccentrically mounted gears provide a conversion of logarithmic variation on the potentiometer to substantially linear variation on the indicator means, and motive means responsive to said detector means for driving the potentiometer to a position which balances the bridge.

11. The system for measuring and indicating a quantity defined in claim 10, in which the motive means drives the indicator through a multiple speed gearing system which is adapted to drive the potentiometer at a rapid pace and then at a slow pace over a short distance each time the driving direction is reversed.

References Cited
UNITED STATES PATENTS

| | | | |
|---|---|---|---|
| 2,211,148 | 8/1940 | Moore | 324—99 X |
| 2,246,679 | 6/1941 | Harrison | 324—100 |
| 2,331,138 | 10/1943 | Ryder | 324—100 |
| 2,405,629 | 8/1946 | Yardeny | 318—31 |
| 2,534,925 | 12/1950 | Petzinger | 324—132 |

WALTER L. CARLSON, *Primary Examiner.*

R. V. ROLINEC, *Assistant Examiner.*